United States Patent [19]

Basile

[11] Patent Number: 4,556,881
[45] Date of Patent: Dec. 3, 1985

[54] ACTIVE, BI-DIRECTIONAL BUS TAP

[75] Inventor: Philip C. Basile, Turnersville, N.J.

[73] Assignee: RCA Corporation, Princeton, N.J.

[21] Appl. No.: 531,281

[22] Filed: Sep. 12, 1983

[51] Int. Cl.$^4$ ............................................. H01H 67/00
[52] U.S. Cl. .................................. 340/825; 178/71 R;
328/164; 371/71
[58] Field of Search ................. 178/70 R, 71 R, 71 C,
178/71 E, 63 A, 73; 179/16 E, 16 F; 328/164;
370/26, 55; 375/3; 307/242, 268; 371/24, 71;
333/24 R; 330/165; 340/825, 825.03

[56] References Cited

U.S. PATENT DOCUMENTS

| | | | |
|---|---|---|---|
| 2,942,196 | 6/1960 | DeLange | 328/164 |
| 3,040,130 | 6/1962 | Hughes | 178/71 R |
| 3,548,175 | 12/1970 | Tomlin | 371/71 |
| 3,904,824 | 9/1975 | Caragliano et al. | 328/164 X |
| 4,012,593 | 3/1977 | Yamaguchi | 179/71 R |
| 4,154,978 | 5/1974 | Tu | 178/71 R |

Primary Examiner—Ulysses Weldon

Attorney, Agent, or Firm—Joseph S. Tripoli; Robert L. Troike; William H. Meise

[57] ABSTRACT

A lossless, bi-directional bus tap for connecting peripheral devices to a common bus. The tap comprises first and second combiner/divider (C/D) networks each having a first input/output (I/O) port which are connected to the two ends of an interruption in the common bus and N second ports with Y db isolation between the I/O port and any of the N second ports and X db isolation between any two of the N second ports. The tap is responsive to an input signal supplied to the I/O port or to input signals supplied to the N second ports to produce, respectively, divided signals on the N second ports and a combined signal on the I/O port. Also provided are two Z db gain amplifiers connected in reverse direction of amplification between first ports of the N second ports of the two C/Ds and between second ports of the N second ports of the two C/Ds, where $X>Z$ and $Z \cong 2Y$, and logic bi-directionally connecting a peripheral device to third ports of the N second ports of the two C/Ds.

8 Claims, 4 Drawing Figures

ACTIVE, BI-DIRECTIONAL BUS TAP

This invention relates generally to bus taps whereby peripheral devices such as microprocessors can be connected to a common network bus, and more specifically, to such a tap which is both bi-directional and fail-safe.

The growth in local area network systems has led to a variety of bus tap concepts. A bus tap is a device which connects to a single information carrying bus and extracts a selected portion of information being carried on the bus for processing by a particular peripheral device, such as a microprocessor. The present state of the art limits the number of taps that can be employed on a common bus in that both bus and tap performance is degraded as the number of taps is increased. Such degradation is due to increased loss introduced by the taps which are, in the present state of the art, totally passive in nature.

By the present invention, the number of taps that can be connected to a given bus can be several thousand or more since each of the active taps is lossless.

In accordance with a preferred form of the invention there is provided first and second combiner/divider (C/D) networks, each having a first input/output port and N second ports (also input/output ports) with Y db of isolation between the first input/output port and any of the N second ports, and X db of isolation between any two of the N second ports, and responsive to an input signal supplied to the first input/output port and to any combination of the N second ports to provide divided signals on the N second ports and a combined signal on the first input/output port, respectively. First and second amplifiers, each having Z db of gain, are respectively connected to provide amplification in a first direction between first ports of the N second ports of the first and second C/D networks and in a second direction between second ports of the N second ports of the first and second C/D networks where $Z=2Y$ and $X \geq Z$. A third C/D network has two ports connected between third ports of the N second ports of the first and second C/D networks and another port for connection to a peripheral device such as a microprocessor.

Figure 1:
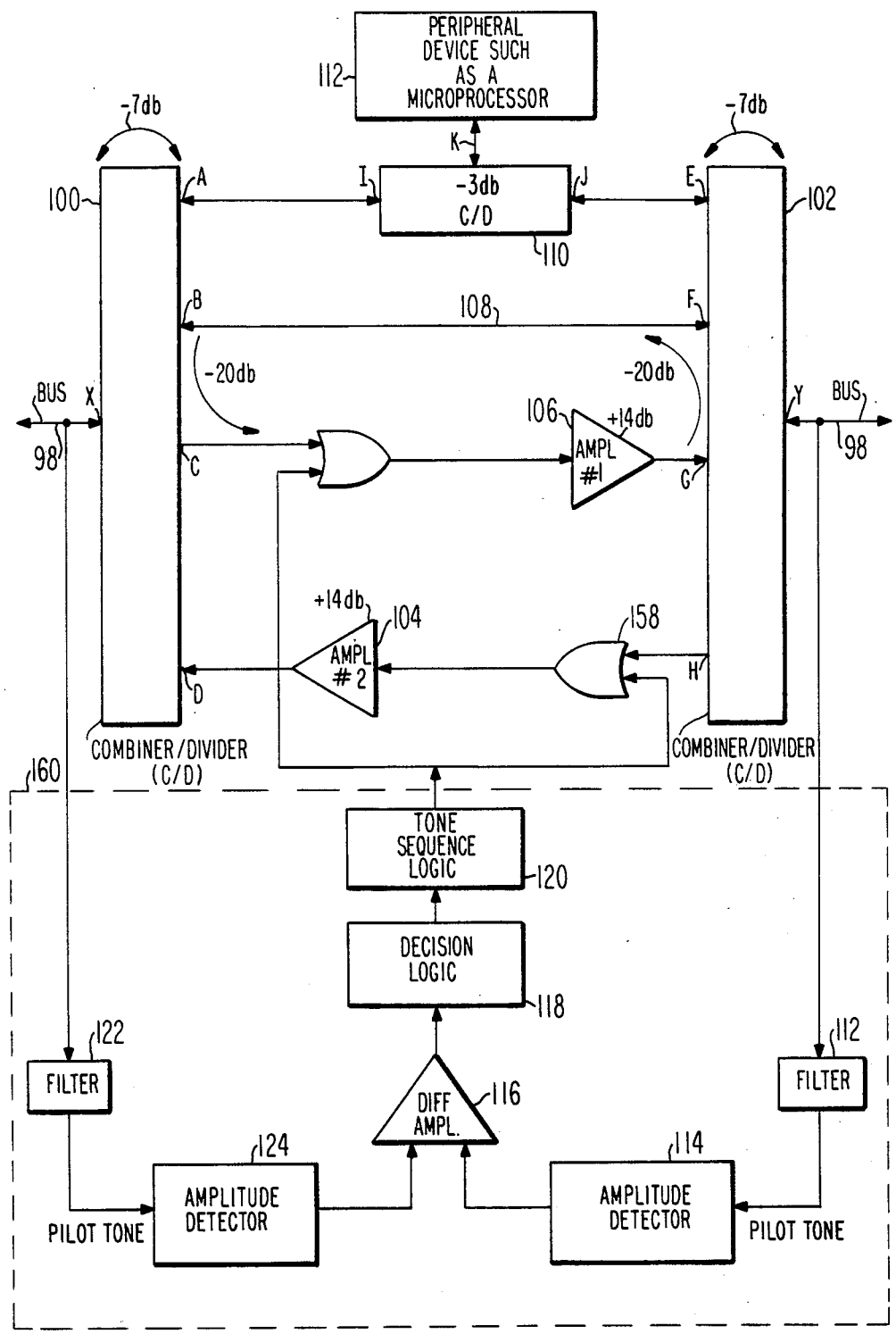
FIG. 1 is a combination block and logic diagram of the invention.

Referring now to FIG. 1, the common bus 98 is connected to input/output port X of C/D network 100. A continuation of bus 98 is connected to input/output port Y of a second C/D network 102. Each of the two C/D networks 100 and 102 are bi-directional in the sense that an input signal supplied to the single terminal, i.e., the input/output port X of C/D network 100, for example, is divided into four signals which appear at the four input/output ports, A, B, C and D. On the other hand, signals supplied to the ports A, B, C and D are combined within C/D network 100 to produce a single output signal at input/output port X. Bus 98 is also bi-directional in that signals will flow in either direction therein.

A more detailed discussion of C/D networks 100 and 102 will be set forth later herein relative to the discussion of FIGS. 2 and 3. For the present it is sufficient to understand that the signal isolation between any two of the four ports A, B, C, D is relatively high and, in the example being discussed, is on the order of 20 db. The signal loss between any one of the ports A, B, C, D and input/output port X is typically 7 db. Since an input signal supplied to port X must pass through both C/D network 100 and C/D network 102, and further since it is desired that the energy level of the signals be the same at both port X and port Y, it is necessary to amplify the signal somewhere within the overall network shown in FIG. 1. Such amplification is effected in one direction by amplifier 106 which is designed to provide 14 db of gain to the signal passing therethrough, thus equalling the 7 db losses incurred in C/D networks 100 and 102.

Similarly, an input signal supplied to port Y of C/D network 102 and outputted at port X of C/D network 100 is amplified 14 db by amplifier 104 to compensate for the 7 db losses in C/D networks 100 and 102. Thus, a lossless bus tap results.

The actual tapping by a peripheral device of the signal supplied to the bus tap of FIG. 1 via bus 98 is accomplished in C/D network 110 which has somewhat different characteristics from those of C/D networks 100 and 102. Specifically, C/D network 110 produces a 3 db loss between ports I and K and also between ports J and K, and 20 db of isolation between ports I and J. Thus a signal supplied to port I will be received by a peripheral device, such as a microprocessor 112, which is connected to port K of C/D network 110 with a 3 db loss. Similarly, a signal supplied to port J will be received via port K at the input to peripheral device 112 with a 3 db loss. Signals supplied from peripheral device 112 to port K of C/D network 110 will appear at the output ports I and J with a 3 db loss. However, the total loss for a signal supplied to input port X, for example, and appearing at port Y after passing straight through C/D 110 will have a 34 db loss. This 34 db loss includes a 7 db loss in each of C/D networks 100 and 102 and a 20 db loss in C/D network 110. Such a signal passing straight through C/D network 110 and appearing at port Y is so small as to be negligible compared with a signal appearing at port Y after the latter signal has been amplified by amplifier 106.

Cross-talk between the various parts of the four ports A, B, C and D or the four ports E, F, G and H is also negligible since the db loss from any one of the four ports, such as ports E, F, G and H to any other one of the four ports, E, F, G and H is 20 db.

A signal supplied to an input/output port, such as port X, and circulating through the system back to port X will have a 6 db loss. For example, a signal flowing from bus 98 to port X, then through C/D network 100 to port C, through amplifier 106, from port G to port H, back through amplifier 104, and then through C/D network 100 to the original input port X will have a total db loss of 6 db. The foregoing path includes the following losses; 7 db through C/D network 100, 20 db from port G to port H, and then another 7 db going back through C/D network 100 for a total of 34 db in losses. The total gain through the circuit just traced is 28 db including a 14 db amplification by both amplifiers 106 and 104. However, the resulting 6 db loss signal has negligible effect in the system since it does not appear at output port Y.

The conductive lead 108 connecting port B to port F of C/D networks 100 and 102 is a fail-safe connection and will function to pass a signal traveling in either direction in the event of the failure of either amplifier 106 or amplifier 104. The total db loss for a signal passing through the lead 108 is 14 db which includes a 7 db loss for each of C/D networks 100 and 102. This signal retains a sufficient energy level to reach the next amplifying repeater in the system. Such repeaters are shown generally as repeaters 144 and 146 in FIG. 4 and are positioned at suitable intervals along the bus 98. They are typically constructed to raise the level of a received signal to a desired level.

Figure 4:
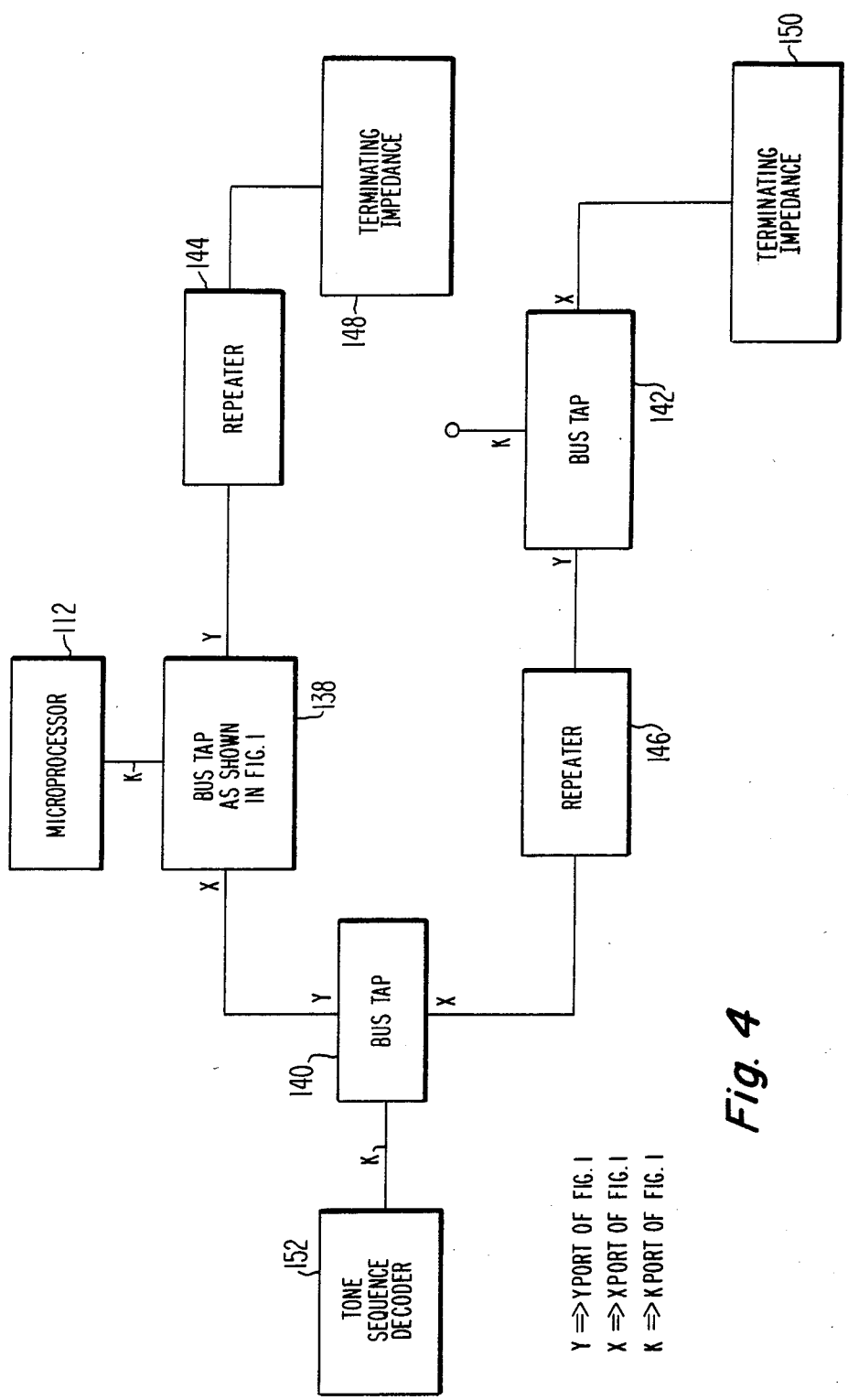
FIG. 4 is a generalized diagram of a system in which the bus tap of FIG. 1 can be employed.

It is also to be understood that other bus taps, such as bus taps 140 and 144 shown in FIG. 4, are positioned as needed along the bus 98 which can be terminated at either end by suitable terminating impedances 148 and 150.

In the event of a failure of either amplifier 106 or 104 of FIG. 1 some means, such as the logic within the dotted block of FIG. 1, is needed to detect such a failure. The logic 160 operates as follows. A pilot signal of a constant and known frequency is present on bus 98 at all times. This pilot signal is always generated as part of the signal being transmitted on bus 98. Thus, for example, if microprocessor 112 is transmitting a signal it will also transmit the pilot signal as part of such signal.

If amplifier 106 fails, the signal, including the pilot signal appearing at port Y of C/D network 102, will be attenuated by 14 db. A filter 112 supplies only the attenuated pilot signal to amplitude detector 114. The output of amplitude detector 114 is supplied to one input of differential amplifier 116. Assuming amplifier 106 to be functioning properly the other input signal to differential amplifier 116 will be the unattenuated pilot signal which is extracted from the total signal on bus 98 by means of filter 122 and amplitude detector 124 which detects the pilot signal at port X of C/D network 100. Thus, the amplitudes of the two pilot signals supplied to differential amplifier 116 will be considerably different since the pilot tone at port Y has been attenuated by 14 db due to the failure of amplifier 106 but the pilot signal at port X has not been so attenuated.

The output of differential amplifier 116 will reflect such difference in the pilot signal amplitude and will energize decision logic 118 which is essentially a switch. When switch 118 is energized by the output of differential amplifier 116 an encoded tone sequence is generated in tone sequence logic 120 and supplied through OR gate 158, amplifier 104, C/D network 100 to port X, and finally back via bus 98 to a tone sequence decoder 152 (FIG. 4), which can be in the form of a peripheral device connected to a bus tap 140 (FIG. 4) which in turn is coupled to bus 98. This tone sequence is encoded by tone sequence logic 120 in a manner which, when decoded, will identify the particular bus tap at which the failure occurred, and will enable an appropriate alarm or other corrective measure.

Figure 2:
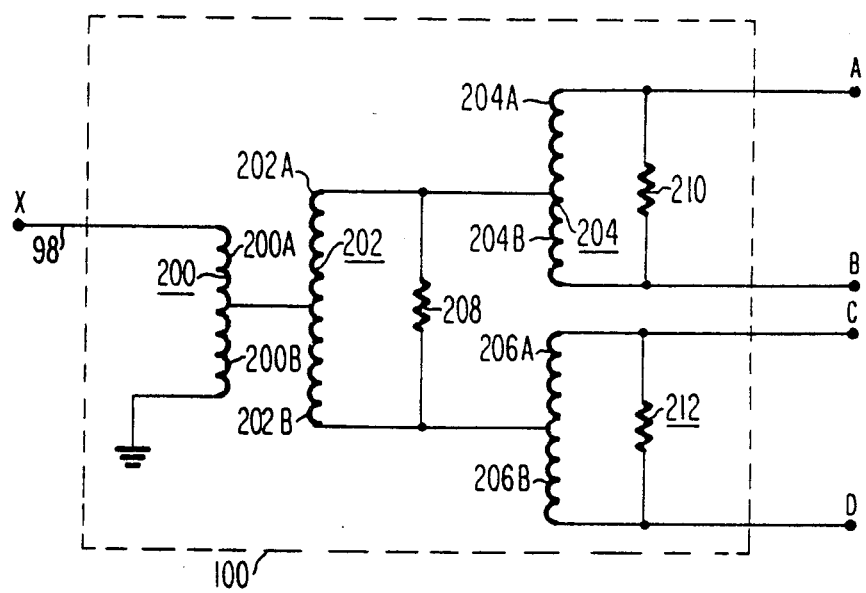
FIG. 2 is a schematic diagram of one of the C/D networks of FIG. 1.

Referring now to FIG. 2 there is shown a schematic diagram of C/D networks 100 and 102 of FIG. 1 in which corresponding portions, particularly the ports thereof, are identified by the same reference characters. Thus, ports X, A, B, C and D of FIG. 2 correspond to ports X, A, B, C and D of FIG. 1. The operation of FIG. 2 is basically as follows:

When acting as a signal divider an input signal supplied to port X will appear across winding 200 whose center tap is connected to the center tap of winding 202. The voltages induced thereby in half-windings 202A and 202B of winding 202 are equal but of opposite polarity so that the voltages supplied to the center taps of the two windings 204 and 206 are equal and in phase.

The half-windings 202A and 202B of winding 202 are coupled respectively to windings 204 and 206 and with the end terminals of winding 202 being connected to the center taps of windings 204 and 206, respectively. Half-windings 204A, 204B, 206A, and 206B are wound in such a manner that the voltages induced in such windings will produce equal and in phase voltages at ports A, B, C, and D, thus completing the division of the input signal supplied to input port X.

Resistors 208, 210, and 212, connected across windings 200, 204, and 206, respectively, provide paths for the release of stored energy in windings 208, 210, and 212 in the event that changes are made in the loads on any of the ports A, B, C, or D.

Consider now the case where the C/D network of FIG. 2 is acting as a signal combiner. Assume a signal is supplied to port A, for example. Current will then flow through half-winding 204A, half-winding 202A, and half-winding 200B to ground. The current through half-winding 204A will induce an undesirable current and voltage in half-winding 204B. However, the current flowing through half-winding 202A will induce an equal and opposite cancelling voltage and current in half-winding 204B, thus leaving the voltage across half-winding 204B equal to zero and isolating port B from Port A.

The current flow through half-winding 202A will induce an undesirable equal and opposite current in half-winding 202B which will tend to induce an undesirable signal in half-windings 206A and 206B. However, the current flow through half-winding 200B will induce an equal and opposite cancelling current in half-winding 202B leaving zero current flow through half-winding 202B.

It is to be noted that any signal induced in half-windings 206A and 206B by any other winding in the system will result in equal and opposite and cancelling currents through half-windings 206A and 206B. Thus, in the ideal case no voltages will appear at ports C and D due to the signal supplied to input port A.

In a similar manner, it can be shown that signals supplied to any of the other ports B, C, or D, in any combination, will each individually pass through the system of FIG. 2 to port X in such a manner that undesirable signals will not appear at any of the other ports due to cancelling effects similar to those discussed above with respect to a signal supplied to port A. The signal appearing at port X is a cumulative one, reflecting the summation of signals supplied to ports A, B, C, and D.

Figure 3:
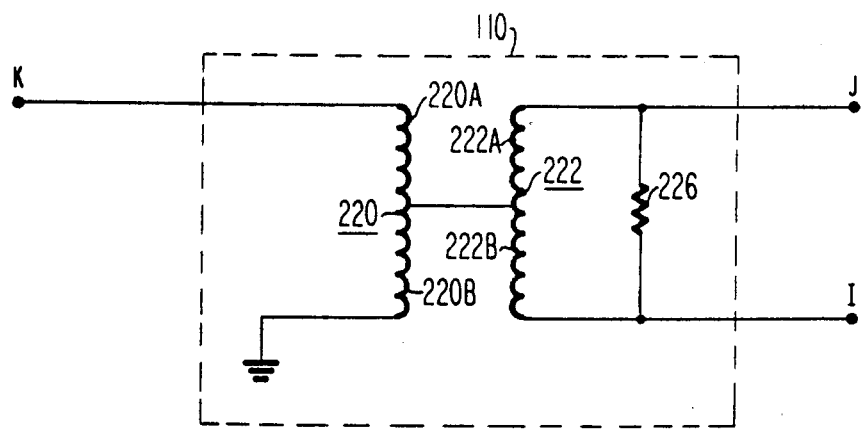
FIG. 3 is a schematic diagram of another form of a C/D network shown in FIG. 1.

Referring now to FIG. 3 there is shown a simpler C/D network which can be employed in lieu of block 110 of FIG. 1. In FIG. 3, if a signal is supplied to port J, for example, a current will flow through half-winding 222A of winding 222 and half-winding 220B of winding 220 to ground.

The voltages generated in half-windings 222A and 220B will induce opposing currents in half-winding 222B. Thus, the voltages and currents induced in half-winding 222B by half-windings 222A and 220B will cancel each other, thereby leaving a voltage only across half-winding 222A and a total resultant voltage across output winding 220 which appears at port K.

The structures of FIGS. 2 and 3 are manufactured by the Olektron Corporation of Dudley, Mass., and identified as Model Nos. FG-HJ-304U and TO-HJ-302U, respectively.

What is claimed is:

1. In a communication system employing a common bus and a plurality of peripheral devices, a bidirectional bus tap for connecting one of said peripheral devices between first and second portions of said bus, said tap comprising:

first and second combiner/divider networks, each of said combiner/divider networks including first, second and third subsidiary ports and a common port, each of said combiner/divider networks providing at least a predetermined isolation between any two of said subsidiary ports, and providing a first predetermined loss in the coupling of signals in either direction between said common port and any one of said subsidiary ports, said common ports of said first and second combiner/divider networks being coupled to first and second portions, respectively, of said bus;

first amplifier means having an input port coupled to said first subsidiary port of said first combiner/divider network and an output port coupled to said first subsidiary port of said second combiner/divider network, said first amplifier means having a gain of approximately twice said predetermined loss for compensating for the loss occasioned by transmission of signals from said first portion of said bus to said second portion of said bus, but having a gain no greater than said predetermined isolation;

second amplifier means having an input port coupled to said second subsidiary port of said second combiner/divider network and an output port coupled to said second subsidiary port of said first combiner/divider network, said second amplifier means having a gain of approximately twice said predetermined loss for compensating for the loss occasioned by transmission of signals from said second portion of said bus to said first portion of said bus, but having a gain no greater than said predetermined isolation; and tap means for bidirectionally connecting said one of said peripheral devices to said third ports of said first and second combiner/divider networks.

2. A bidirectional tap according to claim 1 wherein each of said first and second combiner/divider networks comprises a fourth subsidiary tap, and said fourth subsidiary taps of said first and second combiner/divider networks are coupled together for providing a path for signal flow through said bus tap for providing an auxiliary path for flow of signals in the event that one or both of said first and second amplifier means fails.

3. A bidirectional tap according to claim 2, wherein said tap means comprises:

a third combiner/divider network including a common port and first and second subsidiary ports, said first and second subsidiary ports of said third combiner/divider network being coupled to said third subsidiary ports of said first and second combiner/divider networks, respectively, said common port of said third combiner/divider network being coupled to said one of said peripheral devices, said third combiner/divider network combining signals received at said subsidiary ports of said third combiner/divider network from said third ports of said first and second combiner/divider networks for application to said one peripheral device, and splitting signals received at said common port of said third combiner/divider network from said one of said peripheral devices for application to said third subsidiary ports of said first and second combiner/divider networks.

4. An active, bidirectional bus tap for connecting a peripheral apparatus to two ends of a break in a common bus, said tap comprising:

a first combiner/divider network including a common port adapted to be coupled to one of said ends of said break, and also including first, second and third subsidiary ports, each of said subsidiary ports of said first combiner/divider network being coupled to said common port of said first combiner/divider network with a predetermined loss, and each of said subsidiary ports of said first combiner/divider network being decoupled from another subsidiary port of said first combiner/divider network with at least a predetermined isolation;

a second combiner/divider network including a common port adapted to be coupled to the other end of said break, and also including first, second and third subsidiary ports, each of said subsidiary ports of said second combiner/divider network being coupled to said common port of said second combiner/divider network with said predetermined loss, and each of said subsidiary ports of said second combiner/divider network being decoupled from another subsidiary port of said second combiner/divider network by at least said predetermined isolation;

a first amplifier having a gain approximately equal in magnitude to twice said predetermined loss, but not greater than said predetermined isolation, the input terminal of said first amplifier being coupled to said first subsidiary port of said first combiner/divider network, and the output terminal of said first amplifier being coupled to said first subsidiary port of said second combiner/divider network;

a second amplifier having a gain approximately equal in magnitude to twice said predetermined loss but not greater than said predetermined isolation, the input terminal of said second amplifier being coupled to said second subsidiary port of said second combiner/divider network, and the output terminal of said second amplifier being coupled to said second subsidiary port of said first combiner/divider network; and tap means coupled to said peripheral apparatus and to said third subsidiary ports of said first and second combiner/divider networks for bidirectionally coupling signals between said peripheral apparatus and said third subsidiary ports.

5. A tap according to claim 4 further comprising:

pilot signal supplying means for supplying a pilot signal along said common bus and in sequence through said common port of said first combiner/divider network, said first subsidiary port of said first combiner/divider network, said first amplifier, said first subsidiary port of said second combiner/divider network, and said common port of said second combiner/divider network; and comparator means coupled to said common ports of said first and second combiner/divider networks, said comparator means being responsive to the relative amplitudes of said pilot signal at said common ports of said first and second combiner/divider networks for generating an encoded signal when said relative amplitudes differ by more than a predetermined amount, said encoded signal identifying the particular bus tap at which said relative amplitudes differ by more than said predetermined amount.

6. A bus tap according to claim 5 in which said tap means comprises a third combiner/divider network including a common port and first and second subsidiary ports, said first subsidiary port of said third combiner/divider network being coupled to said third subsidiary port of said first combiner/divider network, and said second subsidiary port of said third combiner/divider network being coupled to said third subsidiary port of said second combiner/divider network, said common port of said third combiner/divider network being coupled to said peripheral device whereby said peripheral device is didirectionally coupled to each of said two ends of said common bus.

7. A bus tap according to claim 5 further comprising connecting means coupled to said comparator means for supplying said encoded signal to said common bus.

8. A bus tap according to claim 5 further comprising connecting means coupled to said comparator means and to said input terminals of said first and second amplifiers for supplying said encoded signal to said common bus.

* * * * *